United States Patent
Chattaraj (10) Patent No.: US 12,028,431 B1
(45) Date of Patent: Jul. 2, 2024

(54) UNIFIED NOTIFICATION SYSTEM

(71) Applicant: T-MOBILE INNOVATIONS LLC, Overland Park, KS (US)

(72) Inventor: Surajit Chattaraj, Maple Valley, WA (US)

(73) Assignee: T-MOBILE INNOVATIONS LLC, Overland Park, KS (US)

(*) Notice: Subject to any disclaimer, the term of this patent is extended or adjusted under 35 U.S.C. 154(b) by 0 days.

(21) Appl. No.: 18/182,208

(22) Filed: Mar. 10, 2023

(51) Int. Cl.
*H04L 67/55* (2022.01)

(52) U.S. Cl.
CPC ................ *H04L 67/55* (2022.05)

(58) Field of Classification Search
CPC ................................................. H04L 67/55
See application file for complete search history.

(56) References Cited

U.S. PATENT DOCUMENTS

| 10,798,145 B1* | 10/2020 | Garney | H04N 21/2407 |
| 2012/0246301 A1* | 9/2012 | Vyrros | A63F 13/34 709/224 |
| 2014/0156785 A1* | 6/2014 | Kammula | H04L 67/55 709/217 |
| 2016/0005301 A1* | 1/2016 | Mason | G08B 25/004 709/206 |
| 2016/0119764 A1* | 4/2016 | Grange | H04W 12/08 455/411 |
| 2017/0339536 A1* | 11/2017 | Lewis | H04W 4/80 |
| 2018/0206083 A1* | 7/2018 | Kumar | H04L 67/30 |
| 2020/0099545 A1* | 3/2020 | Hong | H04L 12/2803 |

FOREIGN PATENT DOCUMENTS

CN     110417915 B  * 12/2021  ............. H04L 41/06

* cited by examiner

*Primary Examiner* — Thu V Nguyen
*Assistant Examiner* — Ranjan Pant
(74) *Attorney, Agent, or Firm* — Shook, Hardy & Bacon L.L.P.

(57) ABSTRACT

Systems and methods are provided for providing a unified notification system. A notification is transmitted to a receiving device and a determination is reached as to whether the message was successfully delivered to the receiving device. If the message was not delivered, a second notification type is utilized to deliver the message to the receiving device. If the message was not delivered to the receiving device, a third notification type is utilized. This cycle repeats a number of times.

19 Claims, 6 Drawing Sheets

UNIFIED NOTIFICATION SYSTEM

SUMMARY

The present disclosure is directed to a unified notification system that will ensure that the user will not miss any important notifications. After the user's preferred way of receiving a message fails, the system will try alternative ways to send the message to the user, to ensure the receiving device receives the notification, as shown and/or described in connection with at least one of the Figures, and as set forth more completely in the claims.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Aspects of the present disclosure are described in detail herein with reference to the attached figures, which are intended to be exemplary and non-limiting, wherein.

DETAILED DESCRIPTION

The subject matter in aspects is provided with specificity herein to meet statutory requirements. However, the description itself is not intended to limit the scope of this patent. Rather, it is contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various technical terms, acronyms, and shorthand notations are employed to describe, refer to, and/or aid the understanding of certain concepts pertaining to the present disclosure. Unless otherwise noted, said terms should be understood in the manner they would be used by one with ordinary skill in the telecommunication arts. An illustrative resource that defines these terms can be found in Newton's Telecom Dictionary, (e.g., 32d Edition, 2022).

As used herein, the term "base station" refers to a centralized component or system of components that is configured to wirelessly communicate (receive and/or transmit signals) with a plurality of stations (i.e., wireless communication devices, also referred to herein as user equipment (UE(s))) in a geographic service area. A base station suitable for use with the present disclosure may be terrestrial (e.g., a fixed/non-mobile form such as a cell tower or a utility-mounted small cell) or may be extra-terrestrial (e.g., an airborne or satellite form such as an airship or a satellite). The terms "latency" and "jitter" are used in their ordinary sense; that is, latency refers to the time it takes for a packet (or series of packets) to travel from its source to its destination (via a network), and jitter refers to variations in latency.

Embodiments of the technology described herein may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media that may cause one or more computer processing components to perform particular operations or functions.

By way of background, user equipment (UE) notifications go to the user by their preference or by the default short message service (SMS) method. If the system is unable to send the notification, the message fails and the system does not try any other notification channel to send the message; thereby rendering those messages lost or never sent to the user. There are many reasons why a message might fail to send, including poor cellular service. For example, if a sending device's service provider is unable to connect to a receiving device's UE carrier, a message will not be delivered, and the message may be lost.

Historically, a sending device would send a receiving device a message in a very specific way (i.e., SMS or text message). If the sending device received a notification that the message failed to send, or was not received by the receiving device, the telecommunications network did not try any other notification channels to send the message to ensure it was received by the receiving device. The only option was for the user of the sending device to repeatedly try to keep sending the message over and over again until the message was either successfully delivered or the sending device stopped trying to send the message. In other words, the receiving device may never receive the message. Additionally, unless the sending device has other contact information for the receiving device, the sending device may not have another way to get the message to the receiving device.

By sequentially trying multiple different channels of communication (i.e., text, SMS, push notifications, automated voice call, email, voicemail, Over-the-top, etc.), there is a much greater chance that the receiving device will receive the message. The present disclosure describes a way to ensure the customer receives the best service by trying different ways and making multiple attempts to get a message to the receiving device. For example, if a sending device associated with a third party application, for example, is attempting to send a message to a receiving device, the sending device may send the message via text. If the message fails to be received by the receiving device, the telecommunications network will automatically try to send the message by way of a different method, such as a second way (e.g., push notification). If the message still fails, the telecommunications network will automatically attempt to send the message a third way (e.g., email). If the message continues to fail, the telecommunication network may continue trying different channels of communication to deliver the message to the receiving device. The combination of all of the different channels used to attempt to deliver the message is called a "notification cycle." The notification cycle will repeat a number of times until either the message is successfully received by the receiving device or a quantity of times repeating the notification cycle meets a threshold. This example is not meant to be limiting to the order in which the channels of communication are attempted. The notification types can be selected by the user associated with the second device or can be selected by a service provider via a system algorithm. In other words, a receiving device may prefer the first notification type be SMS, the second notification type be email, and the third notification type be an automated voice call. The combination of those three preferences makes up that particular user's notification cycle. The notification cycle is repeated until a threshold has been met, where the threshold is a number of total times that a notification cycle has occurred. In some situations, if the user does not select a notification preference, the first notification default may be SMS. In some embodiments, a sending device may be referred to as a first device and a receiving device may be referred to as a second device. In other embodiments, there may not need to be both a sending device and a receiving device; there simply needs to be device that can receive messages (i.e., receiving device).

In other aspects, the telecommunications network may have notice that the receiving device is off the network, or offline. Perhaps the receiving device is located in a different country, on a cruise ship, on an airplane, or simply does not have cellular service. In this situation, the telecommunications network can determine that a different mode of communication may be more successful to deliver the message. For example, in a different country, the receiving device may not be communicatively coupled to the telecommunications network to receive a voice call but may be connected to Wi-Fi and can receive an email or a push notification, such as from an over-the-top (OTT) application that does not require a cellular network. In this situation, the notification types may be selected accordingly (e.g., email, SMS, text, push, voice call, voicemail, OTT) by the service provider via a system algorithm, and may include non-SMS notification types or notification types that are supported by Wi-Fi. This ensures the customer receives the best service by providing them with a greater sense of comfort that they will receive messages that are being sent to them.

A first aspect of the present disclosure is directed to a method for providing notifications via a telecommunications network. The method comprises transmitting, at the telecommunications network, a notification that originated from a first device to a second device via a first notification type, and determining that the notification was not received at the second device using the first notification type. Based on the notification not being received at the second device, determining a second notification type to send the notification to the second device and transmitting, from the telecommunications network, the notification that originated from the first device to the second device via the second notification type, wherein the first notification type is different than the second notification type.

A second aspect of the present disclosure is directed to a method for providing notifications via a telecommunications network. The method comprises transmitting a notification to a device using a first delivery vector and determining that the notification was not received at the device using the first notification vector. Based on the notification not being received at the device, determining a second notification vector that can be used to transmit the notification to the device, transmitting the notification to the device via the second notification vector, wherein the first notification vector is different that the second notification vector, and determining that the notification was not received at the device using the second notification vector. Based on the notification not being transmitted to the device, determining a third notification vector to transmit the notification to the device, transmitting the notification to the device via the third notification vector, and determining that the notification was not received at the device using the third notification vector. Based on the notification not being received at the device, repeating a notification cycle until a threshold has been met.

According to another aspect of the technology described herein, directed to a system for providing notifications via a telecommunications network comprising one or more processors and one or more non-transitory computer storage hardware devices storing computer-usable instructions. The instructions cause the one or more processors to transmit, at the telecommunications network, a notification that originated from a first device to a second device via a first notification type, and determine that the notification was not received at the second device using the first notification type. Based on the notification not being received at the second device, determine a second notification type to send the notification to the second device and transmit, from the telecommunications network, the notification that originated from the first device to the second device via the second notification type, wherein the first notification type is different than the second notification type.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of aspects herein.

Aspects herein may be embodied as, among other things: a method, system, or set of instructions embodied on one or more computer-readable media. Computer-readable media include both volatile and nonvolatile media, removable and non-removable media, and contemplate media readable by a database, a switch, and various other network devices. Computer-readable media includes media implemented in any way for storing information. Examples of stored information include computer-useable instructions, data structures, program circuitry, and other data representations. Media examples include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently. Embodiments may take the form of a hardware embodiment, or an embodiment combining software and hardware. Some embodiments may take the form of a computer-program product that includes computer-useable or computer-executable instructions embodied on one or more computer-readable media.

"Computer-readable media" may be any available media and may include volatile and nonvolatile media, as well as removable and non-removable media. By way of example, and not limitation, computer-readable media may include computer storage media and communication media.

"Computer storage media" may include, without limitation, volatile and nonvolatile media, as well as removable and non-removable media, implemented in any method or technology for storage of information, such as computer-readable instructions, data structures, program circuitry, or other data. In this regard, computer storage media may include, but is not limited to, Random-Access Memory (RAM), Read-Only Memory (ROM), Electrically Erasable Programmable Read-Only Memory (EEPROM), flash memory or other memory technology, CD-ROM, digital versatile disks (DVDs) or other optical disk storage, magnetic cassettes, magnetic tape, magnetic disk storage, or other magnetic storage devices, or any other medium which may be used to store the desired information and which may be accessed by the computing device 700 shown in FIG. 7. Computer storage media does not comprise a signal per se.

"Communication media" may include, without limitation, computer-readable instructions, data structures, program circuitry, or other data in a modulated data signal, such as a carrier wave or other transport mechanism, and may include any information delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above also may be included within the scope of computer-readable media.

A "network" refers to a network comprised of wireless and wired components that provide wireless communications service coverage to one or more user equipment (UE). The network may comprise one or more cell sites, one or more cell sites (i.e., managed by a cell site), one or more cell towers (e.g., having an antenna) associated with each cell site or cell site, a gateway, a backhaul server that connects two or more cell sites, a database, a power supply, sensors, and other components not discussed herein, in various embodiments.

The terms "cell site," "cell tower," and "base station" may be used interchangeably herein to refer to a defined wireless communications coverage area (e.g., a geographic area) serviced by a cell site. It will be understood that one cell site may control one cell site or alternatively, one cell site may control multiple cell sites. As discussed herein, a cell site is deployed in the network to control and facilitate, via one or more antenna arrays, the broadcast, transmission, synchronization, and receipt of one or more wireless signals in order to communicate with, verify, authenticate, and provide wireless communications service coverage to one or more UE that request to join and/or are connected to a network.

An "access point" may refer to hardware, software, devices, or other components at a cell site, cell site, and/or cell tower having an antenna, an antenna array, a radio, a transceiver, and/or a controller. Generally, an access point may communicate directly with user equipment according to one or more access technologies (e.g., 3G, 4G, LTE, 5G, mMIMO (massive multiple-input/multiple-output)) as discussed herein.

The terms "user equipment," "UE," and/or "user device" are used interchangeably to refer to a device employed by an end-user that communicates using a network. UE generally includes one or more antenna coupled to a radio for exchanging (e.g., transmitting and receiving) transmissions with a nearby cell site, via an antenna array of the cell site. In embodiments, UE may take on any variety of devices, such as a personal computer, a laptop computer, a tablet, a netbook, a mobile phone, a smart phone, a personal digital assistant, a wearable device, a fitness tracker, or any other device capable of communicating using one or more resources of the network. UE may include components such as software and hardware, a processor, a memory, a display component, a power supply or power source, a speaker, a touch-input component, a keyboard, and the like. In embodiments, some of the UE discussed herein may include current UE capable of using 5G and having backward compatibility with prior access technologies (e.g., Long-Term Evolution (LTE)), current UE capable of using 5G and lacking backward compatibility with prior access technologies, and legacy UE that is not capable of using 5G.

Additionally, it will be understood that terms such as "first," "second," "third," etc. are used herein for the purposes of clarity in distinguishing between elements or features, but the terms are not used herein to import, imply, or otherwise limit the relevance, importance, quantity, technological functions, sequence, order, and/or operations of any element or feature unless specifically and explicitly stated as such. Along similar lines, certain UE are described herein as being "priority" UE and non-priority UE, but it should be understood that in certain implementations UE may be distinguished from other UEs based on any other different or additional features or categorizations (e.g., computing capabilities, subscription type, and the like).

The terms "servicing" and "providing signal coverage," "providing network coverage," and "providing coverage," are interchangeably used to mean any (e.g., telecommunications) service(s) being provided to user devices. Moreover, "signal strength", "radio conditions," "level of coverage," and like, are interchangeably used herein to refer to a connection strength associated with a user device. For example, these terms may refer to radio conditions between a user device and a beam providing coverage to the user device. In particular, the "signal strength," "level of coverage," and like may be expressed in terms of synchronization signal (SS) measurements/values and/or channel state information (CSI) measurements/values. In the context of 5G, signal strength may be measured by user devices, which may communicate the signal strength to the cell site and/or the beam management system disclosed herein. In particular, a user device may report various measurements. For example, a user device may provide signal strength as certain synchronization signal (SS) measurements, such as a SS reference signal received power (SS-RSRP) value/measurement, a SS Reference Signal Received Quality (SS-RSRQ) value/measurement, a SS signal-to-noise and interference ratio (SS-SINR) value/measurement, and/or the like. Alternatively or additionally, in some embodiments, signal strength may also be measured and provided in terms of channel state information (CSI) values.

Figure 1:
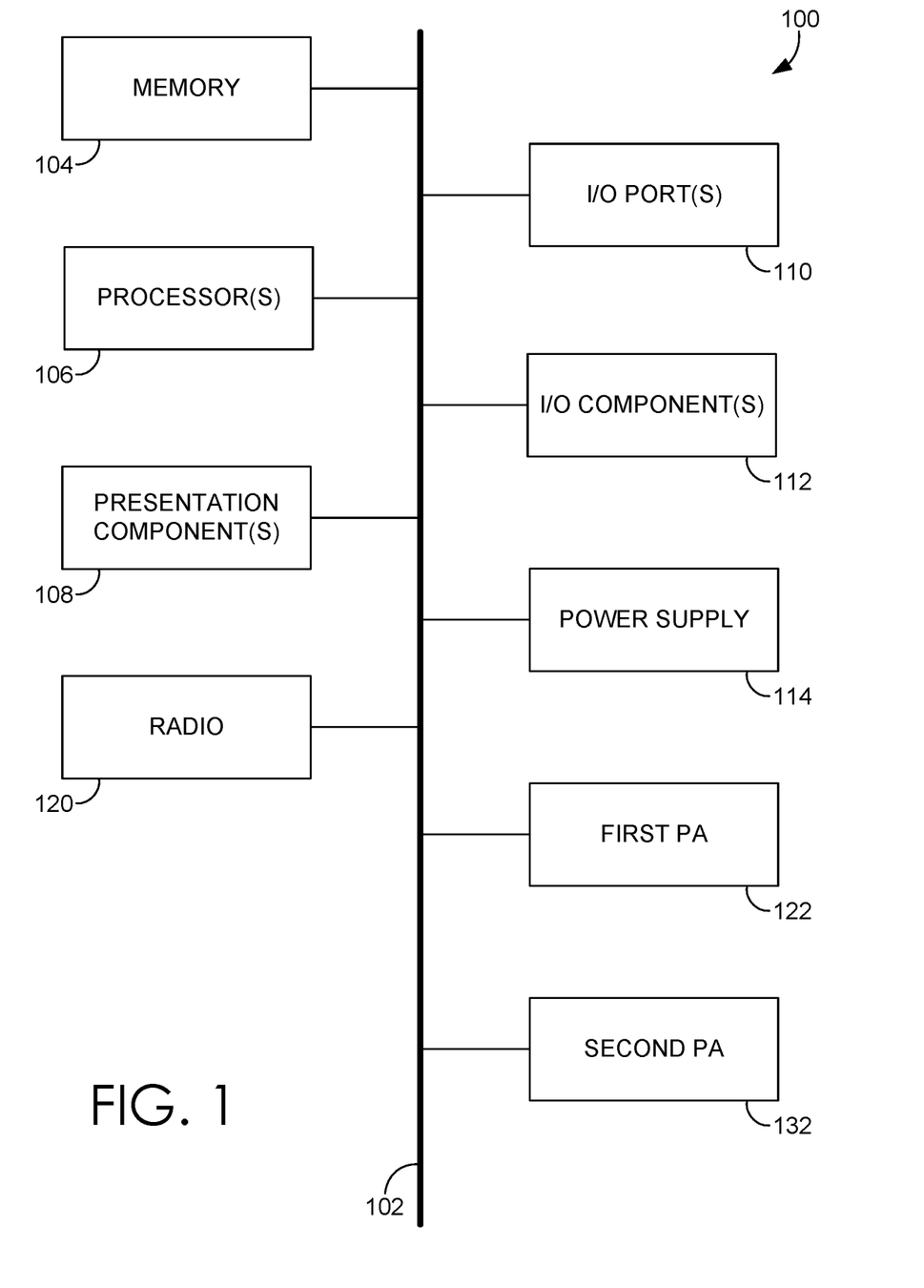
FIG. 1 depicts an exemplary computing environment suitable for use in implementations of the present disclosure.

Referring to FIG. 1, an exemplary computer environment is shown and designated generally as computing device 100 that is suitable for use in implementations of the present disclosure. Computing device 100 is but one example of a suitable computing environment and is not intended to suggest any limitation as to the scope of use or functionality of the invention. Neither should computing device 100 be interpreted as having any dependency or requirement relating to any one or combination of components illustrated. In aspects, the computing device 100 is generally defined by its capability to transmit one or more signals to an access point and receive one or more signals from the access point (or some other access point); the computing device 100 may be referred to herein as a user equipment, wireless communication device, or user device, The computing device 100 may take many forms; non-limiting examples of the computing device 100 include a fixed wireless access device, cell phone, tablet, internet of things (IoT) device, smart appliance, automotive or aircraft component, pager, personal electronic device, wearable electronic device, activity tracker, desktop computer, laptop, PC, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 1, computing device 100 includes bus 102 that directly or indirectly couples the following devices: memory 104, one or more processors 106, one or more presentation components 108, input/output (I/O) ports 110, I/O components 112, and power supply 114. Bus 102 represents what may be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one may consider a presentation component such as a display device to be one of I/O components 112. Also, processors, such as one or more processors 106, have memory. The present disclosure hereof recognizes that such is the nature of the art, and reiterates that FIG. 1 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 104 includes computer-storage media in the form of volatile and/or nonvolatile memory. Memory 104 may be removable, nonremovable, or a combination thereof. Exemplary memory includes solid-state memory, hard drives, optical-disc drives, etc. Computing device 100 includes one or more processors 106 that read data from various entities such as bus 102, memory 104 or I/O components 112. One or more presentation components 108 presents data indications to a person or other device. Exemplary one or more presentation components 108 include a display device, speaker, printing component, vibrating component, etc. I/O ports 110 allow computing device 100 to be logically coupled to other devices including I/O components 112, some of which may be built in computing device 100. Illustrative I/O components 112 include a microphone, joystick, game pad, satellite dish, scanner, printer, wireless device, etc.

A first radio 120 and second radio 130 represent radios that facilitate communication with one or more wireless networks using one or more wireless links. In aspects, the first radio 120 utilizes a first transmitter 122 to communicate with a wireless network on a first wireless link and the second radio 130 utilizes the second transmitter 132 to communicate on a second wireless link. Though two radios are shown, it is expressly conceived that a computing device with a single radio (i.e., the first radio 120 or the second radio 130) could facilitate communication over one or more wireless links with one or more wireless networks via both the first transmitter 122 and the second transmitter 132. Illustrative wireless telecommunications technologies include CDMA, GPRS, TDMA, GSM, and the like. One or both of the first radio 120 and the second radio 130 may carry wireless communication functions or operations using any number of desirable wireless communication protocols, including 802.11 (Wi-Fi), WiMAX, LTE, 3G, 4G, LTE, 5G, NR, VoLTE, or other VoIP communications. In aspects, the first radio 120 and the second radio 130 may be configured to communicate using the same protocol but in other aspects they may be configured to communicate using different protocols. In some embodiments, including those that both radios or both wireless links are configured for communicating using the same protocol, the first radio 120 and the second radio 130 may be configured to communicate on distinct frequencies or frequency bands (e.g., as part of a carrier aggregation scheme). As can be appreciated, in various embodiments, each of the first radio 120 and the second radio 130 can be configured to support multiple technologies and/or multiple frequencies; for example, the first radio 120 may be configured to communicate with a base station according to a cellular communication protocol (e.g., 4G, 5G, 6G, or the like), and the second radio 130 may configured to communicate with one or more other computing devices according to a local area communication protocol (e.g., IEEE 802.11 series, Bluetooth, NFC, z-wave, or the like).

Figure 2:
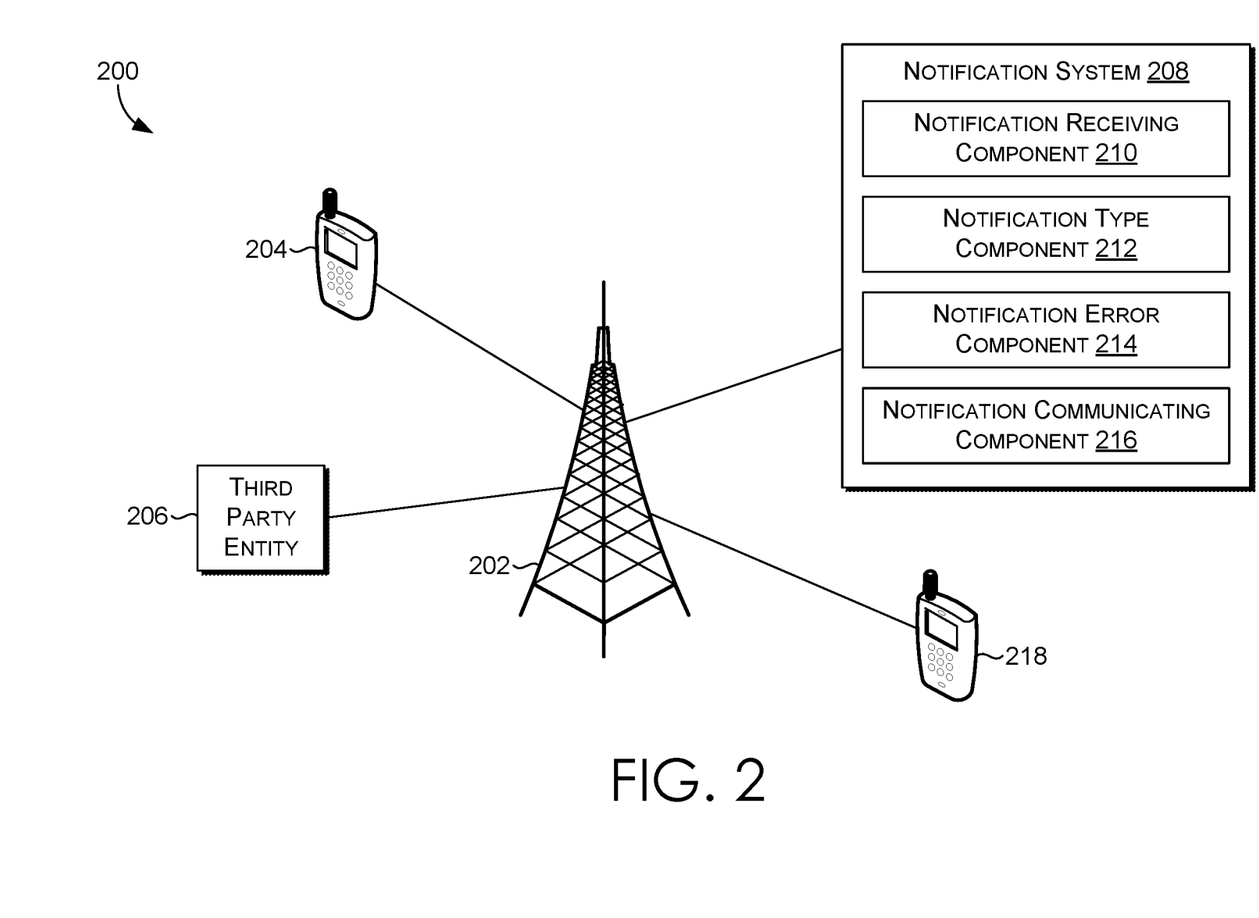
FIG. 2 depicts a diagram of an exemplary computing environment suitable for use in implementations of the present disclosure.

Turning now to FIG. 2, a representative network environment in which the present disclosure may be carried out is illustrated. Such a network environment is illustrated and designated generally as network environment 200. Network environment 200 is but one example of a suitable network environment and is not intended to suggest, including by the form of any illustrated component thereof, any limitation as to the scope of use or functionality of the invention. Neither should the network environment be interpreted as having any dependency or requirement relating to any one or combination of components illustrated. The network environment 200 generally represents a high-level model for ranking cell sites to be decommissioned, as discussed in greater detail herein. The network environment 200 comprises a cell site 202 that provides a sector of coverage area to a plurality of devices that include 204 and 218. The network environment 200 may also include one or more computer processing components that form a notification system 208. The network environment 200 comprises cell site 202 that is configured to wirelessly communicate with one or more user devices, such as the computing device 100 of FIG. 1. For the purpose of this disclosure, a cell site is used in its general sense, being defined as a station for transmitting and/or receiving RF signals; accordingly, the cell site 202 may take the form of a cellular node (e.g. eNodeB, gNodeB, etc.), a relay, an access point (e.g., a Wi-Fi router), or any other desirable emitter and/or receiver of signals that transmits and/or receives wireless signals to/from one or more UEs. A suitable cell site is not protocol-specific, it may be configured to be any wireless telecommunication protocol that is compatible with the plurality of UEs 204 and 2018, such as 4G, 5G, 6G, 802.11x, or any other wireless standard. A suitable cell site is also not exclusive to cellular telecommunication networks, it may take the form of any wireless communication system and used at any desirable frequency (e.g., microwave relays). Cell sites consistent with the present disclosure may be configured to provide coverage to certain geographic service area, and will have one or more backhaul connections that connect it to a broader telecommunications and/or information network, for the provision of telecommunication and/or information service(s) to the plurality of UEs 204 and 218. As illustrated, the cell site 202 may take the form of a macro cell; however, the cell site 202 may take any desirable form, such as a small cell, or a residential Wi-Fi router. As seen in the embodiment illustrated by FIG. 2, cell sites suitable for use in the present disclosure may be terrestrial, that is, they are coupled to the earth via a tower or some other structure, such as the cell site 202; alternatively, a suitable cell site may be extra-terrestrial, that is coupled to an aircraft or a satellite.

The network environment 200 comprises the network. The network comprises any number of components that are generally configured to provide voice and/or data services to wireless communication devices, such as the plurality of UEs 204 and 218, which are wirelessly connected to the cell site 202. For example, the network may comprise one or more additional wireless cell sites, a core network, an IMS network, a PSTN network, a third party entity such as 206, or any number of servers, computer processing components, and the like. The network may include access to the World Wide Web, internet, or any number of desirable data sources which may be queried to fulfill requests from wireless communication devices that make requests via the cell site 202.

The network environment 200 comprises one or more UEs, with which the cell site 202 connects to the network. Generally, each of the plurality of UEs 204 and 218 may have any of the one or more aspects described with respect to the computing device 100 of FIG. 1. For the purposes of the present disclosure, the plurality of UEs 204 and 218 utilize a wireless data connection with the cell site 202. Accordingly, the first UE 204 may be said to have a first wireless connection with the cell site 202, the second UE 218 may be said to have a second wireless connection with the cell site 202. Each of the first UE 204 and the second UE 218 are physically located within the geographic service area served by the cell site 202.

The network environment 200 comprises one or more computer processing components that form the notification system 208. The notification system 208 may comprise one or more components, taking the form of any combination of hardware components, logical components, and computer-programmed services running on one or more computer processing components that are generally configured to identify and communicate if a message has been successfully received by the receiving user. The notification system 208, including its one or more subcomponents, may be disposed at or near the cell site 202, within or adjacent to the network, or disposed in multiple locations. As discussed in the present disclosure, the subcomponents of the notification system 208 are divided by function; however, more or fewer components may carry out the functions of the notification system 208, and the functionality described herein with respect to particular subcomponents of the notification system 208 may be performed by other subcomponents of the notification system 208 without departing from the inventive concept conceived herein. Accordingly, the notification system 208 may be said to comprise a notification receiving component 210, a notification type component 212, a notification error component 214, and a notification communicating component 216.

The notification receiving component 210 receives a notification from any type of device or third party entity such as 206. Once the message has been received by the notification receiving component 210, the notification type component 212 determines a first notification type to be used to send the message to the receiving UE 218. Here, the notification type component 212 may have notice that the receiving UE 218 is not connected to the telecommunications network and may select a non-SMS notification type channel to send the message. For example, the notification type component 212 may determine that a notification channel that relies on Wi-Fi such as OTT or email may be an appropriate method of communication. The notification error component 214 informs the notification system 208 that the message to the receiving UE 218 has not been received. The notification error component 214 may receive a failure message or a simply may not receive a notification that the message was received by the receiving UE 218. The notification communicating component 216 attempts to transmit the message to the receiving UE 218 via a notification cycle. The notification cycle comprises one or more of the different notification methods including SMS, Push, voice call, voice mail, OTT, email, etc. The notification communicating component 216 determines the order of the methods in the notification cycle either by the selection of the receiving UE's 218 user preference or the service provider via a system algorithm. If the receiving UE 218 has not selected a user preference, the default first method of transmitting the notification to the receiving UE 218 may be by SMS. The notification system 208 will repeat the notification cycle until either the notification has been received by the receiving UE 218 or a threshold has been met, where the threshold is a number of total times that a notification cycle has occurred.

Figure 3:
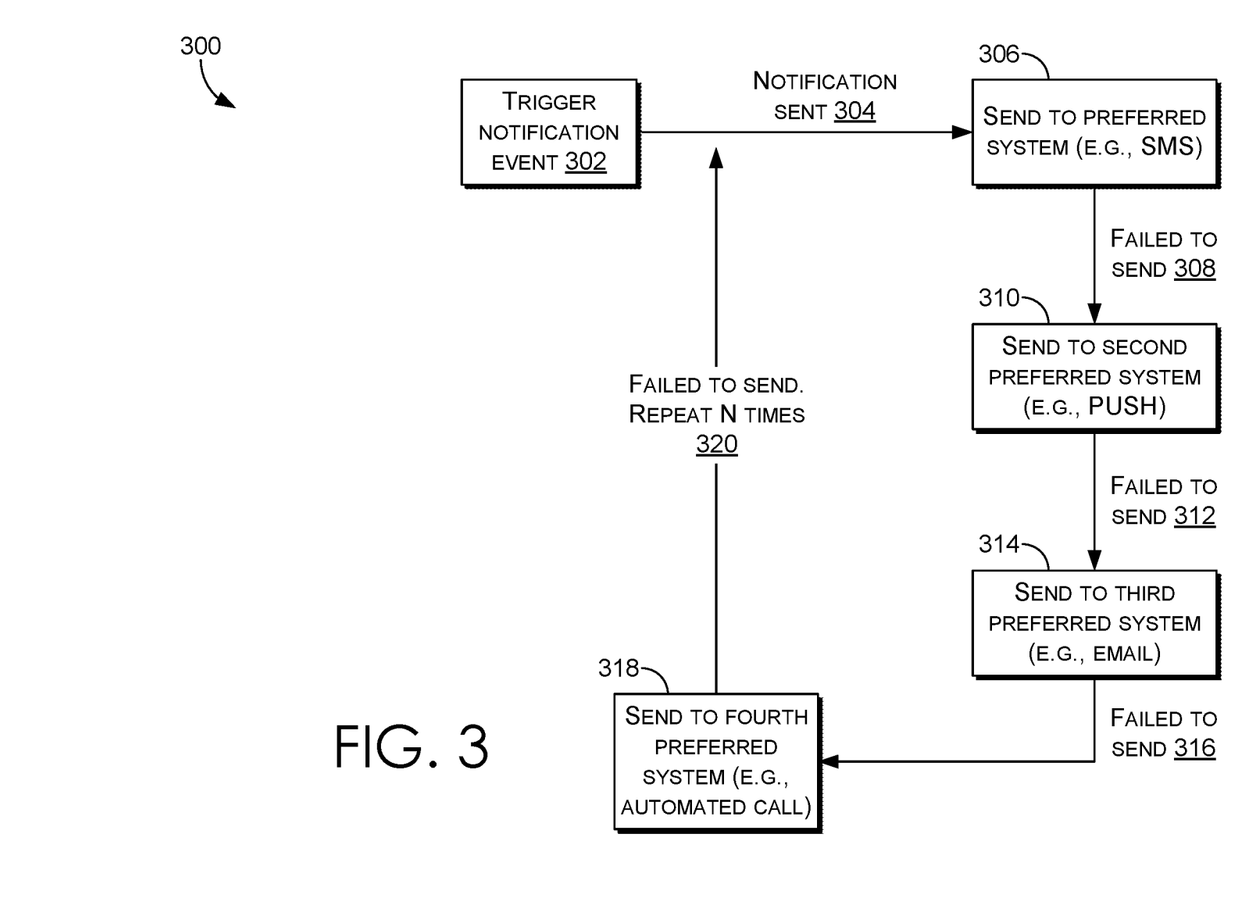
FIG. 3 depicts a flow diagram of an exemplary method for delivering notifications to a UE in accordance with one or more aspects of the present disclosure.

Turning now to FIG. 3, a flowchart is provided of a method 300 for delivering notifications to a receiving UE by repeating the notification cycle 300. Each aspect and component described herein may be performed or associated with one or more component or aspect described above with respect to FIG. 1 or FIG. 2. Notification cycle 300 is but one example of a suitable system and is not intended to suggest, including by the form of any illustrated component thereof, any limitation as to the scope of use or functionality of the invention. Neither should the flowchart be interpreted as having any dependency or requirement relating to any one or combination of components illustrated. Initially at block 302, a notification event is triggered when a message is attempting to be received 304 by the receiving UE. The message is attempted to be sent via the receiving UE's first preferred notification method. If the message fails to send at step 308, the message will be attempted to be sent via the receiving UE's second preferred notification method 310. If the message fails to send at step 312, the message will be attempted to be sent via the receiving UE's third preferred notification method 314. If the message fails to send at step 316, the message will be attempted to be sent via the receiving UE's fourth preferred notification method 318. If the message fails to send at step 320, the notification cycle will be repeated at step 320 a number of times until the message either successfully sends to the receiving UE or a threshold has been met, where the threshold is a number of total times that a notification cycle 300 has occurred.

Figure 4:
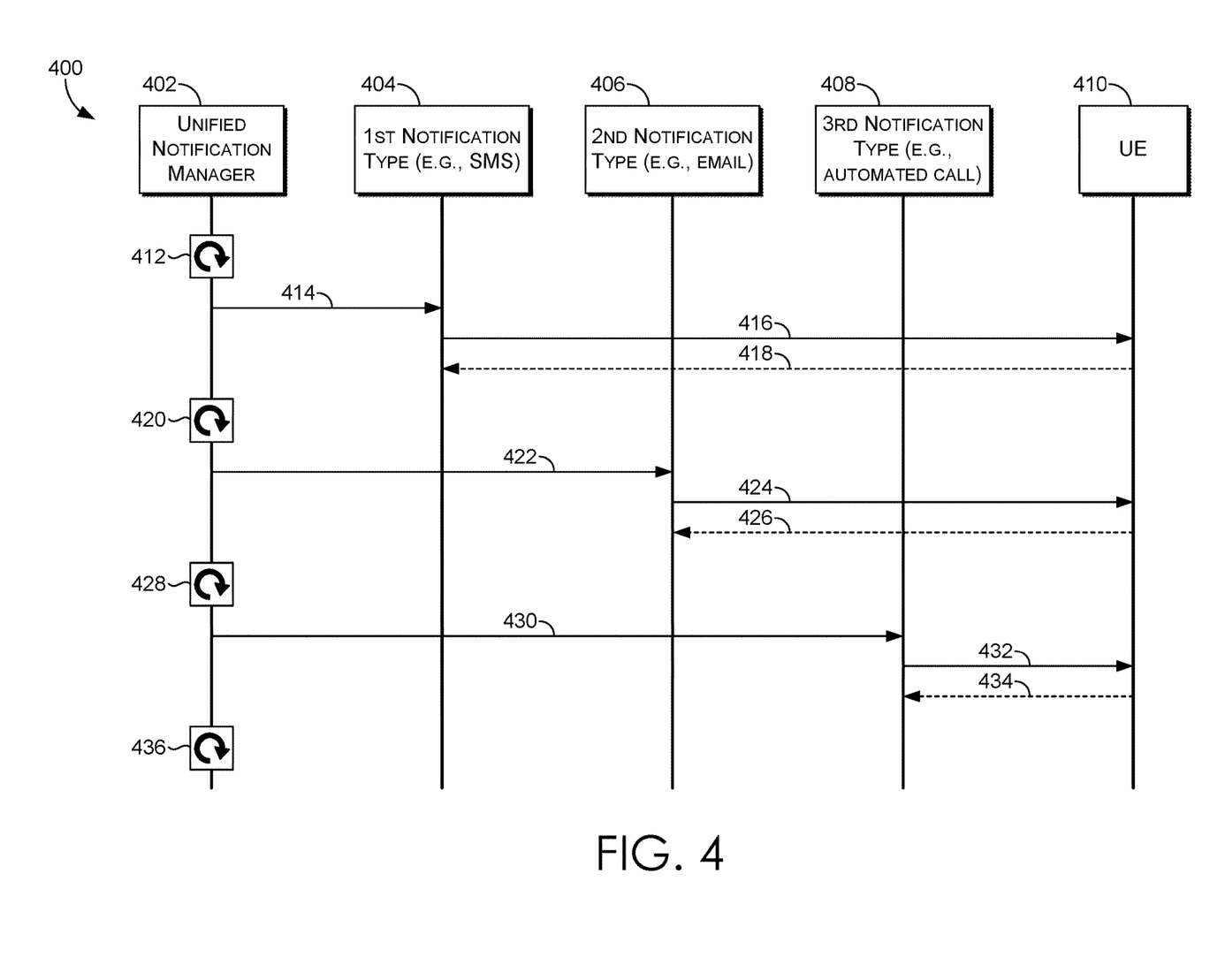
FIG. 4 depicts a call flow for unified notifications in accordance with one or more aspects of the present disclosure.

Turning now to FIG. 4, a flow diagram is provided, illustrating a process flow for a notification cycle. Each aspect and component described herein may be performed or associated with one or more component or aspect described above with respect to FIG. 1, FIG. 2 or FIG. 3. Call flow diagram 400 is but one example of a suitable system and is not intended to suggest, including by the form of any illustrated component thereof, any limitation as to the scope of use or functionality of the invention. Neither should the system be interpreted as having any dependency or requirement relating to any one or combination of components illustrated.

Initially at block 402, the unified notification manager receives a notification and determines a destination. The unified notification manager 402 may determine if the UE 410 has certain notification type capabilities at step 412. The unified notification manager 402 will attempt to send the notification to the UE 410 using the first notification type 404. The notification is sent, at steps 414 and 416, to the UE 410 using the first notification type 404. In some aspects, the UE 410 will receive the first notification type 404. In other aspects, the UE 410 may not receive the notification and will presumably send a receipt of failure message at step 418. The unified notification manager 402 will then refresh at step 420 to determine that the first notification type 404 was unsuccessful and the notification should be sent to the UE 410 via the second notification type 406. The notification is sent, at steps 422 and 424, to the UE 410 using the second notification type 406. In some aspects, the UE 410 will receive the second notification type 406. In other aspects, the UE 410 may not receive the notification and will presumably send a receipt of failure message at step 426. The unified notification manager 402 will then refresh at step 428 to determine that the second notification type 406 was unsuccessful and the notification should be sent to the UE 410 via the third notification type 408. The notification is sent, at steps 430 and 432, to the UE 410 using the third notification type 408. In some aspects, the UE 410 will receive the third notification type 408. In other aspects, the UE 410 may not receive the notification and will presumably send a receipt of failure message at step 434. The unified notification manager 402 will then refresh at step 436 to determine whether the notification was successfully received by the UE 410, if the notification cycle 400 should repeat, or if the notification cycle 400 should stop.

Figure 5:
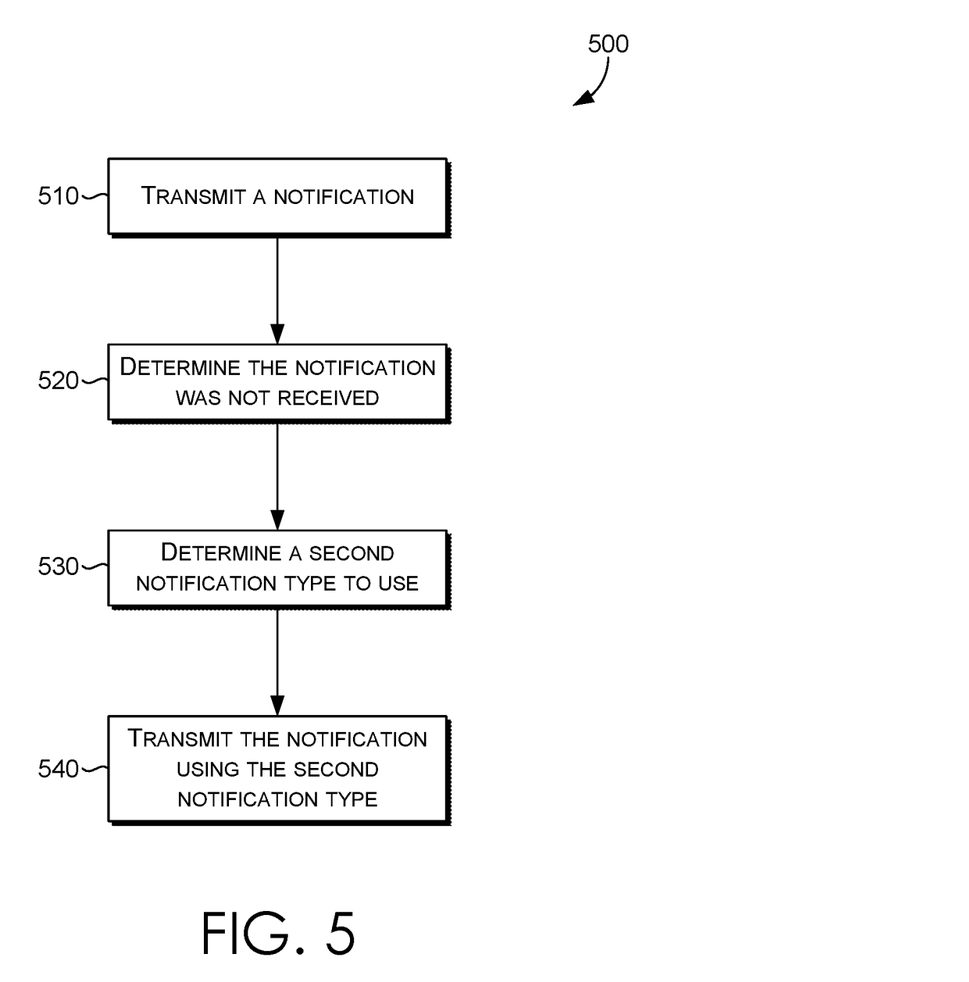
FIG. 5 depicts a flow chart for transmitting a notification to a device using two different notification types in accordance with one or more aspects of the present disclosure.

Turning now to FIG. 5, a flowchart is provided of a method 500 for transmitting a notification to a device using two different notification types. Each aspect and component described herein may be performed or associated with one or more components or aspects described above with respect to FIG. 1, FIG. 2, FIG. 3, or FIG. 4. Flowchart 500 is but one example of a suitable method and is not intended to suggest, including by the form of any illustrated component thereof, any limitation as to the scope of use or functionality of the invention. Neither should the system be interpreted as having any dependency or requirement relating to any one or combination of components illustrated. Initially at block 510, a notification is attempted to be transmitted to a UE. In some aspects, the notification is received by the UE. In other aspects, such as block 520, it is determined that the notification was not received by the UE. This can be determined by a receipt of a failure message or by determining that the message was not successfully received by the UE. At block 530, based on the information that the notification was not received by the UE, a second notification type is determined. Finally, at block 540, the notification is attempted to be transmitted to a UE via the second notification type. Aspects herein may consider whether or not the UE is communicatively coupled to the telecommunications network or has SMS function available. Furthermore, the first notification type and the second notification type may be two different types of notification channels and may be selected by the user associated with the UE based on user preference, or may be selected by the service provider by a system algorithm.

Figure 6:
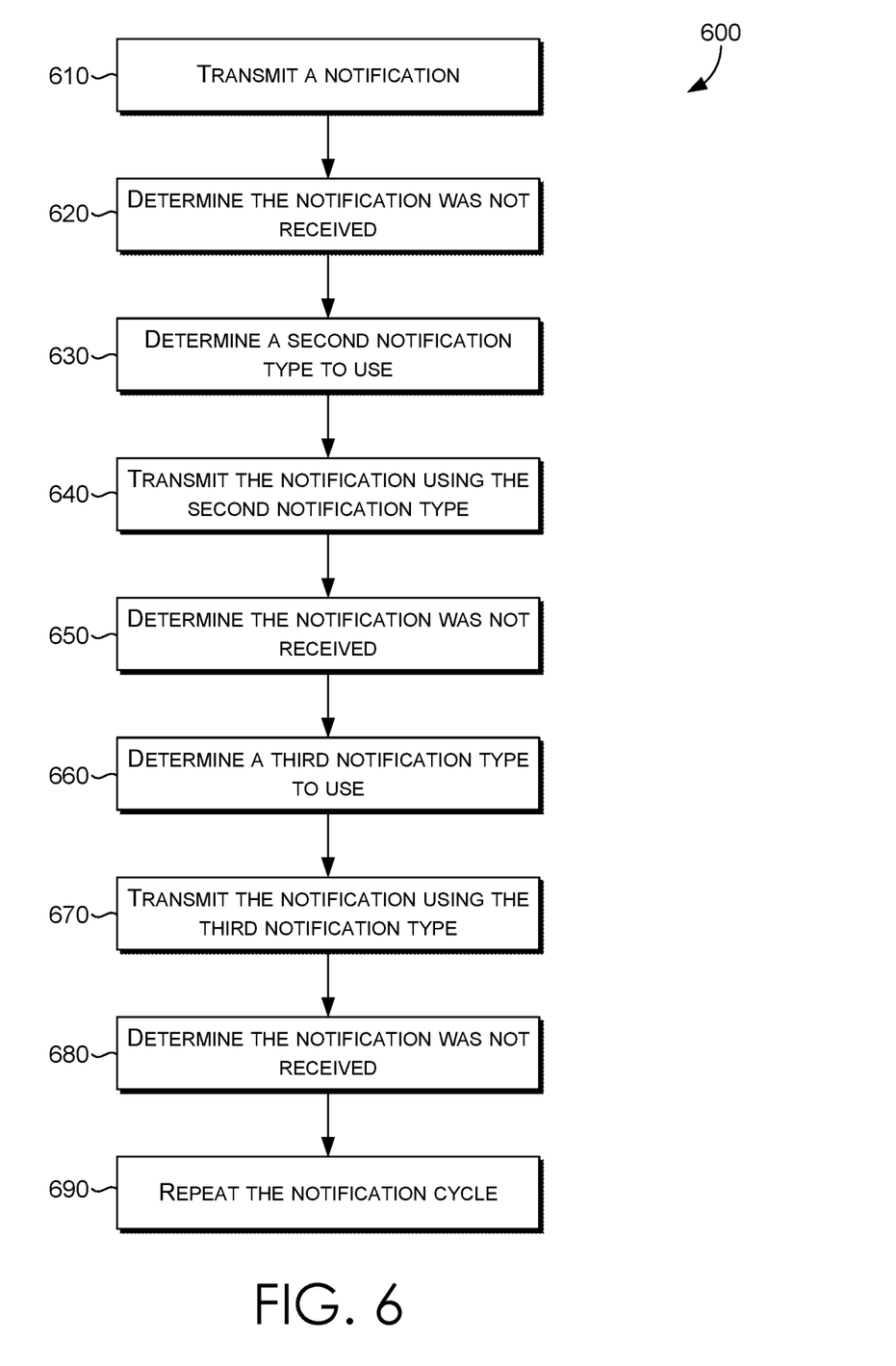
FIG. 6 depicts a flow chart for repeating a notification cycle by transmitting a notification to a device using three different notification types in accordance with one or more aspects of the present disclosure.

Turning now to FIG. 6, a flowchart is provided of a method 600 for transmitting a notification to a device using three different notification types. Each aspect and component described herein may be performed or associated with one or more component or aspect described above with respect to FIG. 1, FIG. 2, FIG. 3, FIG. 4, or FIG. 5. Flowchart 600 is but one example of a suitable method and is not intended to suggest, including by the form of any illustrated component thereof, any limitation as to the scope of use or functionality of the invention. Neither should the system be interpreted as having any dependency or requirement relating to any one or combination of components illustrated. Similar to the description of FIG. 5, at block 610, a notification is attempted to be transmitted to a UE. In some aspects, the notification is received by the UE. In other aspects, such as block 620, it is determined that the notification was not received by the UE. At block 630, based on the information that the notification was not received by the UE, a second notification type is determined. At block 640, the notification is attempted to be transmitted to a UE via the second notification type. In some aspects, the notification is received by the UE. In other aspects, such as block 650, it is determined that the notification was not received by the UE. At block 660, based on the information that the notification was not received by the UE, a third notification type is determined. At block 670, the notification is attempted to be transmitted to a UE via the third notification type. In some aspects, the notification is received by the UE. In other aspects, such as block 680, it is determined that the notification was not received by the UE. At block 690, based on the information that the notification was not received by the UE, the notification cycle 600 is repeated until a threshold is met, where the threshold is the number of times the notification has been attempted to be transmitted to the UE.

Aspects herein may consider whether or not the UE is communicatively coupled to the telecommunications network or has SMS function available. Furthermore, the first notification type, the second notification type, and the third notification type may all be different types of notification channels and may be selected by the user associated with the UE based on user preference, or may be selected by the service provider by a system algorithm.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

The invention claimed is:

1. A method for providing notifications via a telecommunications network, the method comprising:
    at the telecommunications network, transmitting a first notification that originated from a first device to a second device via a first notification type;
    determining that the first notification was not received at the second device using the first notification type, wherein a failure of the first notification to be received at the second device is based on receipt of a failure message at a computer processing component of the telecommunications network;
    determining that the second device is not connected to the telecommunications network;
    based on the second device not being connected to the telecommunications network, selecting a second notification type that can be received by the second device while the second device is not connected to the telecommunications network; and
    transmitting, from the telecommunications network, a second notification that originated from the first device to the second device via the second notification type, wherein the first notification type is different than the second notification type,
    wherein the second notification is transmitted based on the receipt of the failure message.

2. The method of claim 1, wherein the first notification type and the second notification type are one or more of email, SMS, push, phone call, or voicemail.

3. The method of claim 1, wherein the first device is associated with a third party application.

4. The method of claim 1, further comprising:
    determining that the second notification was not received at the second device using the second notification type;
    based on the second notification not being received at the second device, determining a third notification type to send a third notification to the second device; and
    sending the third notification from the first device to the second device via the third notification type, wherein the third notification type is different than the first notification type and the second notification type.

5. The method of claim 4, further comprising transmitting the third notification originating from the first device to the second device until a threshold has been met, wherein the threshold is a number of total times that a notification cycle occurred.

6. The method of claim 5, wherein the notification cycle is a combination of the first notification type, the second notification type, and the third notification type.

7. The method of claim 4, wherein the first notification type, the second notification type, and the third notification type are associated with a communications preference selected by a user associated with the second device.

8. The method of claim 4, wherein the first notification type, the second notification type, and the third notification type are automatically selected by a service provider via a system algorithm.

9. A method for providing notifications via a telecommunications network, the method comprising:
    transmitting a notification to a device using a first delivery vector;
    determining that the notification was not received by the device using the first notification vector, wherein a failure of the notification to be received at the device is based on receipt of a failure message at a computer processing component of the telecommunications network;
    determining that the device is not connected to the telecommunications network;
    based on the device not being connected to the telecommunications network, selecting a second notification vector that can be used to transmit the notification to the device while the device is not connected to the telecommunications network;
    transmitting the notification to the device via the second notification vector, wherein the first notification vector is different that the second notification vector, and wherein the second notification vector is transmitted based on the receipt of the failure message;
    determining that the notification was not received at the device using the second notification vector;
    based on the notification not being transmitted to the device, determining a third notification vector to transmit the notification to the device;
    transmitting the notification to the device via the third notification vector;
    determining that the notification was not received at the device using the third notification vector; and
    based on the notification not being received at the device, repeating a notification cycle until a threshold has been met.

10. The method of claim 9, wherein the notification cycle is a combination of the first notification vector, the second notification vector and the third notification vector.

11. The method of claim 9, wherein the threshold is a number of times that the notification has been sent to the device.

12. The method of claim 9, wherein the first notification vector and the second notification vector are different than the third notification vector.

13. The method of claim 9, wherein the third notification vector is one or more of email, SMS, push, phone call, or voicemail.

14. The method of claim 9, wherein the first notification vector, the second notification vector, and the third notification vector are selected by a user associated with the device based on preference.

15. The method of claim 14, wherein if the user does not select a notification vector preference, the first notification vector default is SMS.

16. The method of claim 9, wherein the first notification vector, the second notification vector, and the third notification vector are selected by a service provider by a system algorithm.

17. A system for providing notifications via a telecommunications network, the system comprising:
one or more processors; and
one or more non-transitory computer storage hardware devices storing computer-usable instructions that, when used by the one of more processors, cause the one or more processors to:
transmit, at the telecommunications network, a first notification that originated from a first device to a second device via a first notification type;
determine that the first notification was not received at the second device using the first notification type;
determine that the second device is not connected to the telecommunications network;
based on the second device not being connected to the telecommunications network, selecting a second notification type that can be received by the second device while the second device is not connected to the telecommunications network; and
communicate, from the telecommunications network, a second notification that was originated from the first device to the second device via the second notification type, wherein the first notification type is different than the second notification type,
wherein the failure of the first notification to be received at the first device is based on receipt of a failure message at a computer processing component of the telecommunications network, and wherein the second notification type is transmitted based on receipt of the failure message.

18. The system of claim 17, further comprising:
determining that the SMS function is unavailable; and
based on the determination that the SMS function is unavailable, selecting a non-SMS notification type for the first and second notification types.

19. The system of claim 17, further comprising:
based on a location of the second device, determining that the second device is not communicatively coupled to any telecommunications network; and
based on the determination that the second device is not communicatively coupled to any telecommunications network, selecting a notification type accordingly.

* * * * *